United States Patent [19]
Manigault

[11] 3,808,013
[45] Apr. 30, 1974

[54] ALUMINA REFRACTORY COMPOSITION
[75] Inventor: Edward L. Manigault, Cincinnati, Ohio
[73] Assignee: The Taylor's Chas. Sons Company, Cincinnati, Ohio
[22] Filed: July 13, 1972
[21] Appl. No.: 271,259

[52] U.S. Cl. .................................................. 106/65
[51] Int. Cl. ............................................. C04b 35/10
[58] Field of Search ....................................... 106/65

[56] References Cited
UNITED STATES PATENTS
3,226,241  12/1965  Miller .................................. 106/65
3,585,058  6/1971  Reardon ............................. 106/66

Primary Examiner—James E. Poer
Attorney, Agent, or Firm—R. L. Lehman

[57] ABSTRACT

A new dense alumina refractory composition has been prepared comprising from 76 percent to 96.5 percent tabular alumina, from 0 percent to 10 percent calcined alumina, from 3 percent to 10 percent silica and from 0.5 percent to 4 percent of a titanium compound selected from the group consisting of rutile titanium dioxide and barium titanate, all of the percentages expressed on a weight basis.

3 Claims, No Drawings

ALUMINA REFRACTORY COMPOSITION

BACKGROUND OF THE INVENTION

When the alumina refractory bodies are prepared, i.e. compositions containing 90 + % alumina, a reaction between the fine alumina and any free silica, which is present in the aluminum composition, takes place and tends to form mullite. This reaction causes a reduction in the density of the refractory to take place. The body also tends to be more porous and linear expansion takes place.

Several attempts have been made to reduce the expansion. Among these have been to add either $Na_2O$ or $Li_2O$ to the refractory material.

When these compounds are added in sufficient quantity to reduce the linear expansion effectively, the fired body loses some of its refractoriness and therefore becomes unacceptable for high temperature service.

SUMMARY OF THE INVENTION

A new composition of matter has been prepared by the instant invention, said composition comprising from 76 percent to 96.5 percent tabular alumina, from 0 percent to 10 percent calcined alumina, from 3 percent to 10 percent silica and from 0.5 percent to 4 percent of a titanium compound selected from the group consisting of rutile titanium dioxide and barium titanate, all of the percentages expressed on a weight basis.

This refractory composition produces fired ceramic bodies which have low porosity and absorption and high bulk density in comparison to prior art high alumina refractory materials. In addition the linear expansion is also reduced.

DESCRIPTION OF THE PREFERRED EMBODIMENTS

In carrying out the instant invention, the major portion of the composition is alumina. The alumina preferably is added both as tabular and calcined alumina. The tabular alumina should be of a size range of −¼ inch through 325 mesh while the calcined alumina should be −325 mesh. Both the barium titanate or rutile and the silica portions should be −325 mesh size.

In preparing the refractory composition of the instant invention, the various ingredients were mixed in the following proportions:

| Ingredients | % |
|---|---|
| Tabular Alumina | 76 to 96.5 |
| Calcined Alumina | 0 to 10 |
| Barium Titanate or Rutile | 0.5 to 4 |
| Silica | 3 to 7 |

To this mixture were added sufficient water and a binder to properly temper the mixture. The mix was then formed into bricks and fired at a temperature between 1,500°C and 1,650°C. The resulting bricks had the following ranges of properties:

| | |
|---|---|
| Modulus of Rupture, psi | 3171 to 6126 |
| Porosity, % | 7.6 to 12.0 |
| Absorption, % | 2.3 to 3.8 |
| Bulk Density, g/cc | 3.18 to 3.27 |
| Linear Change, % | −0.16 to +0.14 |

In order to describe the instant invention more fully, the following examples are presented:

EXAMPLE 1

In this example the following ingredients were thoroughly blended together to form a ceramic mixture. The amounts of each ingredient and the size ranges are also listed:

| INGREDIENT | SIZE RANGE (mesh) | WT., KG |
|---|---|---|
| Tabular Alumina | −4 + 14 | 33.5 |
| Tabular Alumina | −14 + 60 | 19.5 |
| Tabular Alumina | −60 325 | 21.0 |
| Tabular Alumina | −325 | 14.0 |
| Calcined Alumina | −325 | 7.0 |
| Fumed Silica | −325 | 5.0 |
| Barium Titanate | −325 | 1.5 |
| Lignin Liquor | — | 1.0 |
| Water | — | 2.4 |

The above ingredients were blended in a muller-type mixer, then formed into bricks (9 inches × 4½ inches × 3 inches) and, after drying, were fired at 1,560°C for five (5) hours.

The resulting bricks had the following properties:

| | |
|---|---|
| Modulus of Rupture, psi | 5415 |
| Porosity, % | 11.0 |
| Absorption, % | 3.4 |
| Bulk Density, gm/cc | 3.22 |
| Linear Change, % | −0.25 |

EXAMPLES 2–5

The procedure of Example 1 was repeated except that varying amounts of barium titanate were used in these Examples.

The results obtained are recorded along with those of Example 1 in the following table.

For control purposes the same procedure described in Example 1 was repeated except that no barium titanate was added. Again the results are recorded in the following table.

| INGREDIENTS | EXAMPLE NUMBER | | | | | |
|---|---|---|---|---|---|---|
| | 1 | 2 | 3 | 4 | 5 | Control |
| Tabular Alumina, kg | 88 | 88 | 88 | 88 | 88 | 88 |
| Calcined Alumina, kg | 7 | 7 | 7 | 7 | 7 | 7 |
| Silica, kg | 5 | 5 | 5 | 5 | 5 | 5 |
| Barium Titanate, kg | 1.5 | 0.5 | 1.0 | 2.0 | 3.0 | — |
| Modulus of Rupture, psi | 5415 | 5185 | 6101 | 6002 | 6126 | 3870 |
| Porosity, % | 11.0 | 12.0 | 10.6 | 10.2 | 9.4 | 13.7 |
| Absorption, % | 3.4 | 3.8 | 3.3 | 3.1 | 2.9 | 4.4 |
| Bulk Density, g/cc | 3.22 | 3.18 | 3.22 | 3.24 | 3.26 | 3.13 |
| Linear Change, % | −0.25 | −0.16 | −0.36 | −0.30 | −0.42 | +0.22 |

EXAMPLES 6-8

In these examples the procedure of Example 1 was repeated except that the amounts of −325 calcined and tabular $Al_2O_3$ and silica were varied. The amounts used and the results obtained are recorded in the following table:

| INGREDIENTS | EXAMPLE NUMBER | | |
|---|---|---|---|
| | 6 | 7 | 8 |
| Tabular alumina, +325 mesh, kg | 71.8 | 71.8 | 71.8 |
| Tabular alumina, −325 mesh, kg | 21.2 | 18.2 | 14.2 |
| Calcined alumina, −325 mesh, kg | 2.0 | 7.0 | 4.0 |
| Silica, −325 mesh, kg | 5.0 | 3.0 | 10.0 |
| Barium Titanate, −325 mesh, kg | 1.0 | 1.0 | 1.0 |
| Modulus of Rupture, psi | 4183 | 4564 | 5333 |
| Porosity, % | 12.0 | 12.4 | 7.6 |
| Absorption, % | 3.8 | 3.8 | 2.3 |
| Bulk Density, gm/cc | 3.18 | 3.21 | 3.27 |
| Linear Change, % | −0.30 | −0.59 | −0.54 |

EXAMPLES 9-10

In these examples rutile titanium dioxide was used in place of barium titanate. The other ingredients were held constant. The results of these runs are recorded as follows:

| INGREDIENTS | EXAMPLE NUMBER | |
|---|---|---|
| | 9 | 10 |
| Tabular Alumina, +325 mesh, kg | 71.8 | 71.8 |
| Tabular Alumina, −325 mesh, kg | 16.2 | 16.2 |
| Calcined Alumina, −325 mesh, kg | 7.0 | 7.0 |
| Silica, −325 mesh, kg | 5.0 | 5.0 |
| Barium Titanate, −325 mesh, kg | 0 | 0 |
| $TiO_2$ (Rutile), −325 mesh, kg | 0.5 | 1.0 |
| Modulus of Rupture, psi | 3765 | 3171 |
| Porosity, % | 10.8 | 10.7 |
| Absorption, % | 3.4 | 3.4 |
| Bulk Density, gm/cc | 3.22 | 3.21 |
| Linear Change, % | +0.03 | +0.14 |

From the above tables it has clearly been shown that the alumina bricks prepared with the addition of barium titanate or rutile produces products which are superior to bricks made without the addition of barium titanate or rutile. Apparently, the reaction between the alumina and silica to form mullite is retarded when barium titanate or rutile is added to the mixture and therefore the linear expansion is reduced along with the porosity. In addition, the density is increased by the barium titanate or rutile addition.

While this invention has been described and illustrated by the examples shown, it is not intended to be strictly limited thereto, and other variations and modifications may be employed within the scope of the following claims.

I claim:

1. A refractory composition comprising from 76 percent to 96.5 percent tabular alumina, from 0 percent to 10 percent calcined alumina, from 3 percent to 10 percent silica and from 0.5 percent to 4 percent of a titanium compound selected from the group consisting of rutile titanium dioxide and barium titanate, all of the percentages expressed on a weight basis.

2. A method for the preparation of a refractory composition which comprises admixing from 76 percent to 96.5 percent tabular alumina, from 0 percent to 10 percent calcined alumina, from 3 percent to 10 percent silica and from 0.5 percent to 4 percent of a titanium compound selected from the group consisting of rutile titanium dioxide and barium titanate to form a mixture, all of the percentages been added on a weight basis, forming a body of said mixture and firing said body at a temperature from 1,500°C to 1,650°C to form said refractory composition.

3. Method according to claim 2 in which the tabular alumina employed is of size from −¼ inch through 325 mesh and the size of the calcined alumina, the silica and the titanium compound are all −325 mesh.

* * * * *

UNITED STATES PATENT OFFICE
CERTIFICATE OF CORRECTION

Patent No. 3,808,013　　　　　　　　　　Dated April 30, 1974

Inventor(s) EDWARD L. MANIGAULT

It is certified that error appears in the above-identified patent and that said Letters Patent are hereby corrected as shown below:

Please correct the Assignee in the above patent to read as follows:

THE CHAS. TAYLOR'S SONS COMPANY

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents